US011125358B2

(12) United States Patent
Leeson et al.

(10) Patent No.: US 11,125,358 B2
(45) Date of Patent: *Sep. 21, 2021

(54) STACKABLE BRACKETS FOR MICRODUCTS AND CABLES

(71) Applicant: PPC BROADBAND FIBER LTD., Woodbridge (GB)

(72) Inventors: Kim Leeson, Ipswich (GB); Harvey Etheridge, Ipswich (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,830

(22) Filed: Jun. 2, 2020

(65) Prior Publication Data

US 2020/0292103 A1 Sep. 17, 2020

Related U.S. Application Data

(63) Continuation of application No. 16/218,474, filed on Dec. 12, 2018, now Pat. No. 10,670,169.

(Continued)

(51) Int. Cl.
*F16L 3/223* (2006.01)
*H02G 3/04* (2006.01)
(Continued)

(52) U.S. Cl.
CPC ............. *F16L 3/2235* (2013.01); *F16L 3/13* (2013.01); *H02G 3/0456* (2013.01); *H02G 3/32* (2013.01)

(58) Field of Classification Search
CPC ... F16L 3/2235; F16L 3/13; F16L 3/22; F16L 3/227; F16L 3/221; H02G 3/32
(Continued)

(56) References Cited

U.S. PATENT DOCUMENTS 1,488,025 A * 3/1924 Poynter .................. G07D 9/002
  211/49.1
3,387,343 A * 6/1968 Fitsz-Gerald ........... F16L 3/221
  403/188
(Continued)

FOREIGN PATENT DOCUMENTS

JP    H0942538 A    2/1997
KR    200473891 Y1    8/2014

OTHER PUBLICATIONS

Search Report dated Apr. 26, 2019 in corresponding International Application No. PCT/IB2018/001596, 3 pages.
(Continued)

*Primary Examiner* — Christopher Garft
*Assistant Examiner* — Michael McDuffie
(74) *Attorney, Agent, or Firm* — MH2 Technology Law Group LLP

(57) ABSTRACT

A stackable bracket includes a base, and a plurality of clips configured to extend from the base. Each of the plurality of clips is configured to include a pair of holding members, each of the holding members of the plurality of clips is configured to define an opening configured to receive one of a plurality of cables or ducts, and the openings of each pair of holding members are configured to be aligned with one another in a first direction. The plurality of clips are configured to be arranged sequentially relative to one another in a second direction perpendicular to the first direction, the holding members of the plurality of clips are configured to be staggered relative to one another in the first direction, the holding members of a first one of the plurality of clips are configured to overlap the holding members of a second one of the plurality of clips in second direction, and each of the holding members includes a pair of raised ribs configured to (Continued)

be aligned with a corresponding pair of grooves in one of the plurality of cables or ducts.

21 Claims, 6 Drawing Sheets

Related U.S. Application Data

(60) Provisional application No. 62/597,926, filed on Dec. 12, 2017.

(51) Int. Cl.
*F16L 3/13* (2006.01)
*H02G 3/32* (2006.01)

(58) Field of Classification Search
USPC .... 248/689, 55, 62, 65, 68.1, 73, 74.1, 74.2, 248/74.4; 211/49.1, 59.4, 70.3, 70.4, 211/126.7, 182
See application file for complete search history.

(56) References Cited

U.S. PATENT DOCUMENTS

| | | | | |
|---|---|---|---|---|
| 4,347,998 A * | 9/1982 | Loree | ............... | F16L 3/2235 138/115 |
| 5,735,412 A * | 4/1998 | Sheckells | ............... | B65D 57/00 206/443 |
| 5,992,802 A * | 11/1999 | Campbell | ............... | H02G 3/30 248/68.1 |
| 5,996,945 A * | 12/1999 | Coles | ............... | F16L 3/2235 24/16 R |
| 6,182,837 B1 * | 2/2001 | Crabtree | ............... | B65D 81/05 206/443 |
| 6,241,200 B1 * | 6/2001 | Camporeale | ............ | F16L 3/223 248/68.1 |
| 6,939,165 B1 * | 9/2005 | Wu | ............... | F16L 3/2235 248/68.1 |
| 7,278,613 B2 * | 10/2007 | Roy | ............... | F16L 3/02 248/49 |
| 7,922,012 B2 * | 4/2011 | Sisley | ............... | H02G 3/0406 211/60.1 |
| 7,942,371 B1 * | 5/2011 | McCoy | ............... | H02G 9/02 248/68.1 |
| 8,132,771 B2 * | 3/2012 | Lee | ............... | B60P 7/08 108/53.1 |
| 8,262,035 B2 * | 9/2012 | Bleus | ............... | F16L 3/1025 248/230.7 |
| 8,294,030 B2 * | 10/2012 | Pollard, Jr. | ............... | H02G 3/30 174/155 |
| 8,783,631 B2 * | 7/2014 | McCoy | ............... | F16L 3/02 248/68.1 |
| 8,807,492 B2 * | 8/2014 | Lake | ............... | F16L 1/0246 248/68.1 |
| 9,416,896 B1 * | 8/2016 | Kato | ............... | F16L 3/222 |
| 9,732,884 B1 * | 8/2017 | Keller | ............... | F16L 3/2235 |
| 9,750,156 B2 * | 8/2017 | Hopperton | ............... | H02G 3/06 |
| 10,122,157 B1 * | 11/2018 | Gintz | ............... | F16L 3/08 |
| 10,670,169 B2 * | 6/2020 | Etheridge | ............... | F16L 3/13 |
| 2003/0123834 A1 | 7/2003 | Burek et al. | | |
| 2009/0067804 A1 | 3/2009 | Knorr et al. | | |
| 2010/0258685 A1 * | 10/2010 | Gardner | ............... | F16L 3/23 248/68.1 |
| 2011/0084039 A1 * | 4/2011 | Walters | ............... | A47F 7/0028 211/85.13 |
| 2011/0303799 A1 * | 12/2011 | Blanchard | ............... | F16L 3/127 248/65 |
| 2012/0160723 A1 * | 6/2012 | Harms | ............... | A61M 5/003 206/438 |
| 2014/0175231 A1 * | 6/2014 | Cox | ............... | H02G 3/04 248/68.1 |
| 2019/0145551 A1 * | 5/2019 | Schwalbe | ............... | H02G 3/32 248/67.5 |
| 2019/0323632 A1 * | 10/2019 | Bechtold | ............... | H02G 3/32 |

OTHER PUBLICATIONS

Written Opinion dated Apr. 26, 2019 in corresponding International Application No. PCT/IB2018/001596, 9 pages.
International Preliminary Report on Patentability dated Jun. 16, 2020 in corresponding International Application No. PCT/IB2018/001596, 10 pages.

* cited by examiner

STACKABLE BRACKETS FOR MICRODUCTS AND CABLES

CROSS-REFERENCE TO RELATED APPLICATIONS

This application is a continuation of U.S. application Ser. No. 16/218,474, filed Dec. 12, 2018, pending, which the benefit of U.S. Provisional Application No. 62/597,926, filed Dec. 12, 2017. The disclosure of the prior applications is hereby incorporated by reference herein in its entirety.

This nonprovisional application is related to U.S. patent application Ser. No. 16/141,970, filed on Sep. 25, 2018, the disclosure of which is hereby incorporated by reference herein.

BACKGROUND

The present disclosure is directed toward an apparatus for managing ducts, cables, wires, cords, and the like, and more particularly, to a stackable bracket for routing ducts, cables, wires, and/or cords and/or an assembly of stackable brackets for routing ducts, cables, wires, and/or cords.

There are many products available that assist in organizing, managing and routing wires. These products vary in form and composition. For example, "J" clips are conventionally used to retain cords, cables, and tubing. However, such "J" clips are fiddly, weak, and small. Further, "J" clips are difficult to install due to needing a hammer to insert a nail through the "J" clip and into the wall. Additionally, difficult installation is compounded by lack of space where the wall meets the ceiling, which is where such clips are normally installed.

Another simple cable organizer is the widely used nylon wire tie, having a head and a pawl that loops around the wires. A general-purpose nylon wire tie can group wires together and when used in conjunction with an adhesive backed mounting base, it can be used to anchor wires to a flat surface. However, a typical general-purpose nylon wire tie cannot be reused, because the head is self-locking and once the pawl is inserted into the head it is locked in and is cut off in order to remove the wire tie. A releasable cable tie has interlocking teeth along its pawl and is adjusted by depressing a tab connected to the head. The releasable cable tie can be reused, however, it is generally not compatible with an adhesive backed mounting base and thus cannot anchor wires to a flat surface.

Other commercially available cord clips used for organizing cables have an adhesive backed base and a retaining arm designed to hold cords. The use of a cord clip is advantageous over a releasable cable tie, in that the cord clip can attach cords to a flat surface in addition to organizing them. Additionally, cord clips that have thicker retaining arms are advantageous over general-purpose ties, as they partially cover the cords, thus allowing for slightly more stable positioning. However, cord clips are often very small and flimsy, and cannot hold large cords, cables, or tubing. Also, cord clips are difficult to handle, in that the rounded retaining arm of the clip is made of rigid plastic and has a small range of motion. This rigid structure can only be raised a rather limited amount and the cables inserted in the clip invariably are smaller in diameter than that of the clip. A cable that is slightly larger than the cord clip would have to be forced into the clip, likely resulting in damage to the cable or breaking of the cord clip.

For each of the foregoing reasons, it may be desirable to provide a stackable bracket that securely holds one or more ducts, cables, cords, wires, or tubing. It may further be desirable to provide an assembly of stackable brackets that holds ducts, cables, cords, wires, or tubing.

SUMMARY

According to various aspects of the disclosure, a stackable bracket assembly includes a first bracket including a first base, and a first plurality of clips configured to extend from a top surface of the first base, and a second bracket including a second base and a second plurality of clips configured to extend from a top surface of the second base. Each of the first plurality of clips is configured to include a pair of C-shaped holding members, and each of the second plurality of clips is configured to include a pair of C-shaped holding members. Each of the C-shaped holding members of the first plurality of clips is configured to define an opening configured to receive one of a first plurality of cables or ducts, and each of the C-shaped holding members of the second plurality of clips is configured to define an opening configured to receive one of a second plurality of cables or ducts. The openings of each pair of C-shaped holding members are configured to be aligned with one another in a first direction. The first plurality of clips are configured to be arranged sequentially relative to one another in a second direction perpendicular to the first direction, and the second plurality of clips are configured to be arranged sequentially relative to one another in the second direction; the C-shaped holding members of the first plurality of clips are configured to be staggered relative to one another in the first direction, and the C-shaped holding members of the second plurality of clips are configured to be staggered relative to one another in the first direction; and the C-shaped holding members of a first one of the first plurality of clips are configured to overlap the C-shaped holding members of a second one of the first plurality of clips in second direction, and the C-shaped holding members of a first one of the second plurality of clips are configured to overlap the C-shaped holding members of a second one of the second plurality of clips in second direction. Each of the C-shaped holding members includes a pair of raised ribs configured to be aligned with a corresponding pair of grooves in one of the first and second pluralities of cables or ducts. A plurality of locating members extending from the top surface of one of the first base and the second base are being configured to be received by a corresponding plurality of receptacles in a bottom surface of an opposite one of the first bracket and the second bracket.

In some embodiments, the C-shaped holding members of the first plurality of clips are configured to hold a duct or a cable having a first outside diameter, and the C-shaped holding members of the second plurality of clips are configured to hold a duct or a cable having a second outside diameter that is different from the first outside diameter.

In some embodiments, a first one of the pairs of the C-shaped holding members of the first plurality of clips is configured to hold a duct or a cable having a first outside diameter, and a second one of the pairs of the C-shaped holding members of the second plurality of clips are configured to hold a duct or a cable having a second outside diameter that is different from the first outside diameter.

According to various aspects of the disclosure, a stackable bracket assembly includes a first bracket including a first base, and a first plurality of clips configured to extend from a top surface of the first base, and a second bracket including a second base and a second plurality of clips configured to extend from a top surface of the second base. Each of the first plurality of clips is configured to include a pair of holding members, and each of the second plurality of clips is configured to include a pair of holding members. Each of the holding members of the first plurality of clips is configured to define an opening configured to receive one of a first plurality of cables or ducts, and each of the holding members of the second plurality of clips is configured to define an opening configured to receive one of a second plurality of cables or ducts. The openings of each pair of holding members are configured to be aligned with one another in a first direction. The first plurality of clips are configured to be arranged sequentially relative to one another in a second direction perpendicular to the first direction, and the second plurality of clips are configured to be arranged sequentially relative to one another in the second direction. A plurality of locating members extending from the top surface of one of the first base and the second base are being configured to be received by a corresponding plurality of receptacles in a bottom surface of an opposite one of the first bracket and the second bracket.

In some embodiments, the holding members of the first plurality of clips are configured to be staggered relative to one another in the first direction, and the holding members of the second plurality of clips are configured to be staggered relative to one another in the first direction.

In some embodiments, the holding members of a first one of the first plurality of clips are configured to overlap the holding members of a second one of the first plurality of clips in second direction, and the holding members of a first one of the second plurality of clips are configured to overlap the holding members of a second one of the second plurality of clips in second direction.

In some embodiments, each of the holding members includes a pair of raised ribs configured to be aligned with a corresponding pair of grooves in one of the first and second pluralities of cables or ducts.

In some embodiments, the holding members of the first plurality of clips are configured to hold a duct or a cable having a first outside diameter, and the holding members of the second plurality of clips are configured to hold a duct or a cable having a second outside diameter that is different from the first outside diameter.

In some embodiments, a first one of the pairs of the holding members of the first plurality of clips is configured to hold a duct or a cable having a first outside diameter, and a second one of the pairs of the holding members of the second plurality of clips are configured to hold a duct or a cable having a second outside diameter that is different from the first outside diameter.

In accordance with various aspects of the disclosure, a stackable bracket includes a base, and a plurality of clips configured to extend from the base. Each of the plurality of clips is configured to include a pair of holding members, each of the holding members of the plurality of clips is configured to define an opening configured to receive one of a plurality of cables or ducts, and the openings of each pair of holding members are configured to be aligned with one another in a first direction. The plurality of clips are configured to be arranged sequentially relative to one another in a second direction perpendicular to the first direction, the holding members of the plurality of clips are configured to be staggered relative to one another in the first direction, the holding members of a first one of the plurality of clips are configured to overlap the holding members of a second one of the plurality of clips in second direction, and each of the holding members includes a pair of raised ribs configured to be aligned with a corresponding pair of grooves in one of the plurality of cables or ducts.

In some embodiments, the holding members of the first plurality of clips are configured to hold a duct or a cable having a first outside diameter.

In some embodiments, a first one of the pairs of the holding members of the plurality of clips is configured to hold a duct or a cable having a first outside diameter.

In some embodiments, the base includes a plurality of locating members extending from the top surface of the base, the locating members being configured to be received by a corresponding plurality of receptacles in a bottom surface of a second bracket.

In some embodiments, the holding members are C-shaped.

In some embodiments, the base is substantially planar and comprises a rigid material.

Features and advantages of the present disclosure are described in, and will be apparent from, the following Brief Description of the Drawings and Detailed Description, where like numbers are used to represent like parts.

DETAILED DESCRIPTION OF EMBODIMENTS

The present invention provides a cable clip for organizing and routing cables, wires, tubing, and the like. More particularly, the present invention satisfies the need for a product that provides for convenient organization of cables or tubing and that is also designed to route cables or tubing of varying sizes securely, allowing for stable routing at any desired angle. In the detailed description that follows, like element numerals are used to describe like elements shown in one or more of the figures.

Figure 1:
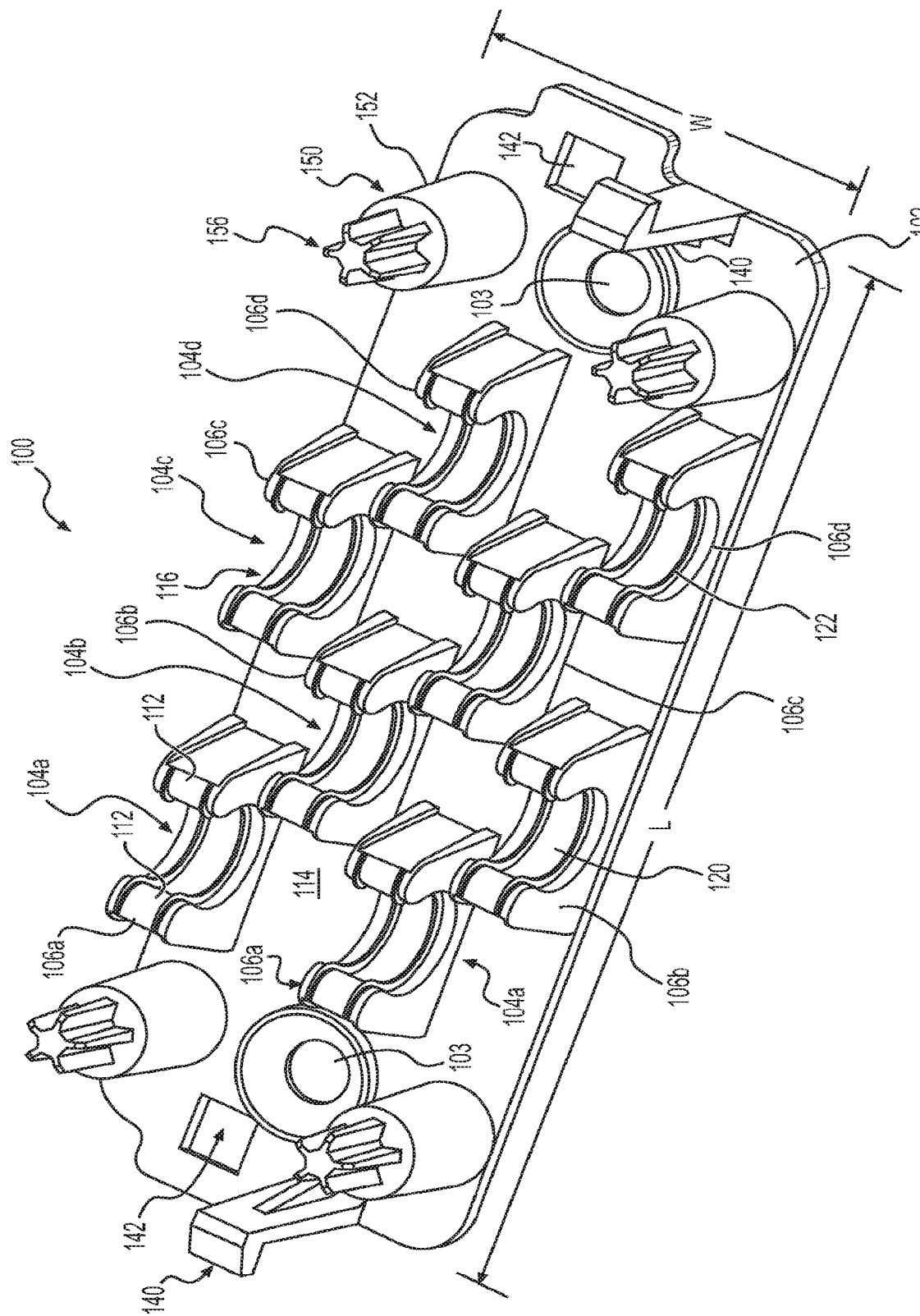
FIG. 1 is a perspective view of an exemplary stackable bracket for microducts in accordance with various aspects of the disclosure.

FIG. 1 illustrates an exemplary bracket 100 for managing ducts, cables, wires, cords, and the like. The bracket 100 includes a base 102, which may be made, for example, from a relatively rigid material. In some aspects, the base 102 is a substantially planar member having a first dimension L (e.g., a longitudinal dimension) and a second dimension W (e.g., a width dimension). The bracket 100 includes a plurality of clips 104a, 104b, 104c, 104d configured to receive a cable, wire, cord, or the like.

Each of the clips 104a, 104b, 104c, 104d includes a pair of C-shaped holding members that are spaced apart from one another in a direction of the second dimension W of the base 102. For example, as shown in FIG. 1, the first clip 104a includes a first pair of holding members 106a, the second clip 104b includes a second pair of holding members 106b, the third clip 104c includes a third pair of holding members 106c, and the fourth clip 104d includes a fourth pair of holding members 106d.

The clips 104a, 104b, 104c, 104d are disposed sequentially along a first dimension L of the base 102, and the pairs of holding members 106a, 106b, 106c, 106d are staggered relative to one another in the direction of the second dimension W of the base 102. For example, as shown in FIG. 1, the first and third pairs of holding members 106a, 106c are closer to a first side of the base 102 in the second direction and the second and fourth pairs of holding members 106b, 106d are closer to a second side of the base 102 that is opposite to the first side in the direction of the second dimension W of the base 102. The staggered configuration of the pairs of holding members 106a, 106b, 106c, 106d in the second dimension W of the base 102 permits adjacent ones of the pairs of holding members 106a, 106b, 106c, 106d to overlap one another in the first dimension L. Consequently, the first dimension L of the base 102 and thus the size of the bracket 100 can be minimized. The base 102 may include one or more openings 103 configured to receive a fastener, for example, a screw, to attach the bracket 100 to a wall or other desired surface. Although four clips 104a, 104b, 104c, 104d are illustrated in FIG. 1, it should be appreciated that the bracket 100 may include more or less than four clips.

Each of the holding members 106a, 106b, 106c, 106d includes a pair of arms 112 extending from a top surface 114 of the base 102. The free ends of the arms 112 are spaced from one another to provide an opening 116 for receiving a duct, cable, wire, cord, or the like. The openings 116 of each pair of holding members 106a, 106b, 106c, 106d are aligned with one another in the direction of the second dimension W of the base 102. That is, the openings 116 of the first pair of holding members 106a are aligned with one another, the openings 116 of the second pair of holding members 106b are aligned with one another, the openings 116 of the third pair of holding members 106c are aligned with one another, and the openings 116 of the fourth pair of holding members 106d are aligned with one another. With regard to the aforementioned staggered configuration of the clips 104a, 104b, 104c, 104d relative to the second dimension W of the base 102, the pairs of holding members 106a, 106b, 106c, 106d are permitted to overlap one another in the direction of the first dimension L, as long as the openings 116 of each the pairs of holding members 106a, 106b, 106c, 106d are not obstructed.

Figure 2:
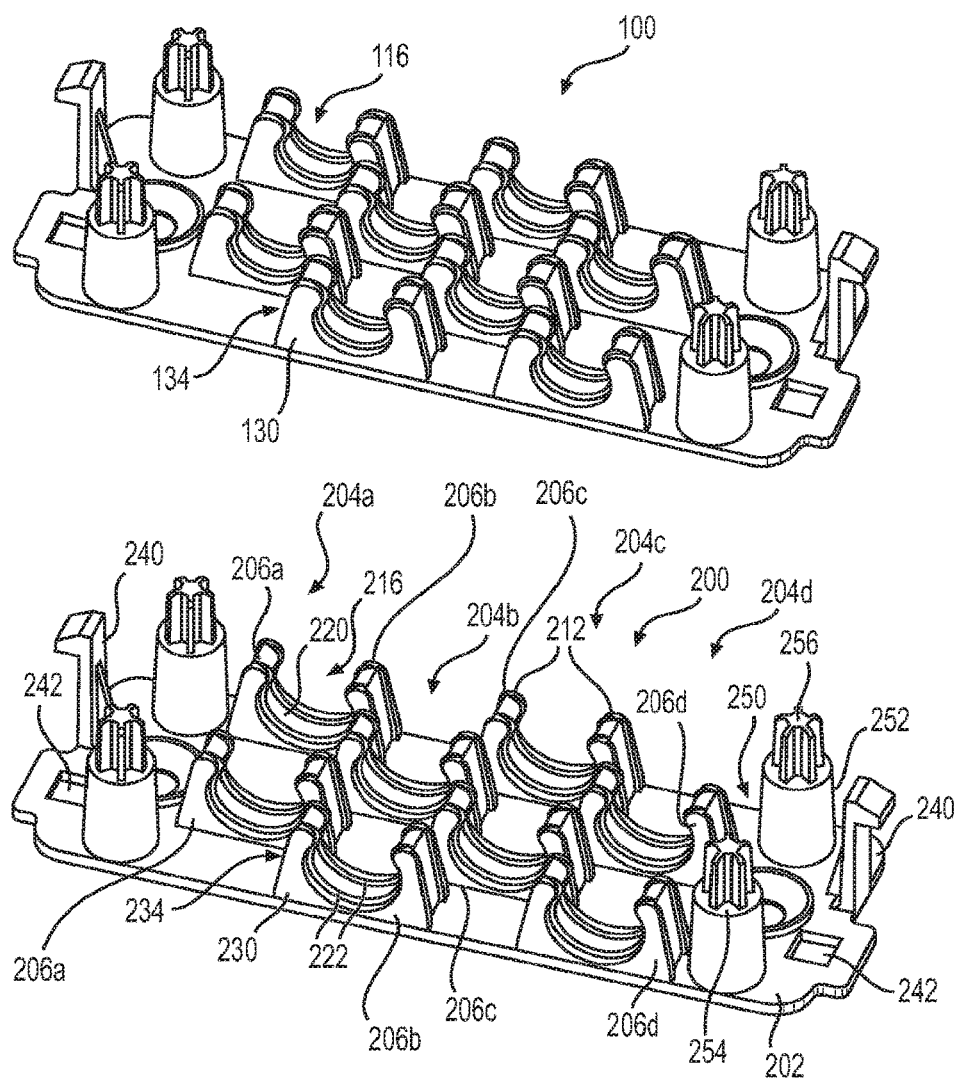
FIG. 2 is a perspective view of the components of an assembly of stackable brackets in accordance with various aspects of the disclosure.
Figure 2:
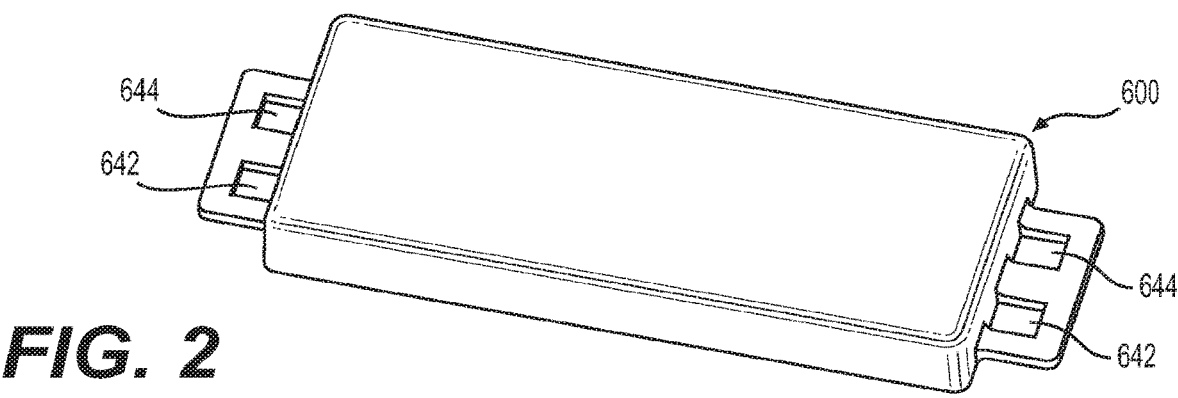

The arms 112 of the holding members 106a, 106b can be sized to accommodate a cable or duct having a desired diameter. For example, as shown in FIG. 2, the holding members 106a, 106b of the bracket 100 may be configured to hold a duct or cable having an 8 mm outside diameter, such as, for example, an 8 mm microduct configured to house an optical fiber cable, while the holding members 206a, 206b of a second bracket 200 may be configured to hold a duct or cable having a 10 mm outside diameter, such as, for example, a 10 mm microduct configured to house an optical fiber cable. Meanwhile, the base 102 of the bracket 100 is the same size and shape as the base 202 of the second bracket 200.

Figure 3:
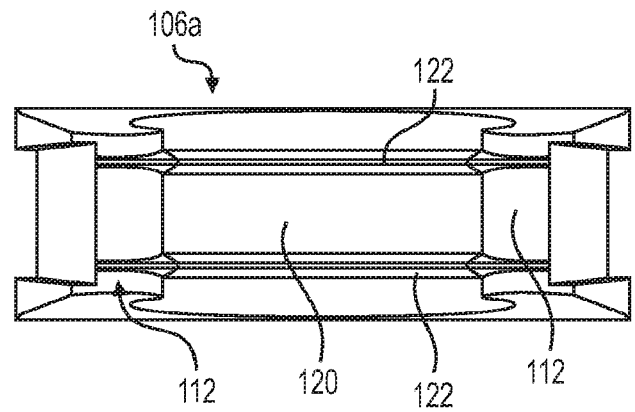
FIG. 3 is a top view of an exemplary holding member of a clip of a stackable bracket in accordance with various aspects of the disclosure.
Figure 4:
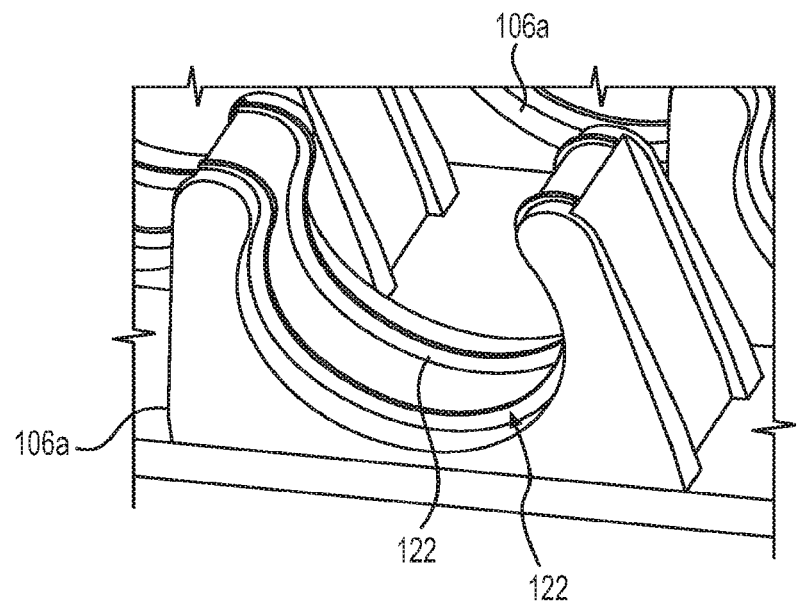
FIG. 4 is a perspective view of an exemplary holding member of a clip of a stackable bracket in accordance with various aspects of the disclosure.

The holding members 106a, 106b, 106c, 106d, 206a, 206b, 206c, 206d may have an inner wall 120, 220 that includes raised ribs 122, 222 extending in a circumferential direction of the holding members 106a, 106b, 106c, 106d, 206a, 206b, 206c, 206d. Although FIGS. 1-5 illustrate each holding member 106a, 106b, 106c, 106d, 206a, 206b, 206c, 206d having two raised ribs, it should be understood that each holding member 106a, 106b, 106c, 106d, 206a, 206b, 206c, 206d may include one raised rib or three or more raised ribs. The arms 112, 212 of the holding members 106a, 106b, 106c, 106d, 206a, 206b, 206c, 206d may have outer walls 130, 230 that include a thinned region 134, 234. The thinned regions 134, 234 may provide the arms 112, 212 with more flexibility to allow the arms 112, 212 to move away from one another to enlarge the opening 116, 216 when a cable or duct is being inserted into the holding members 106a, 106b, 106c, 106d, 206a, 206b, 206c, 206d. The raised ribs 122, 222 may be configured to flow over a top of the clip, as shown in FIG. 3, thereby allowing a user to locate a duct or cable onto the holding members 106a, 106b, 106c, 106d, 206a, 206b, 206c, 206d before the duct or cable is pushed into the opening 116, 216. The arms 112, 212 may be designed with a desired flexibility to accommodate insertion of the cable or duct while also preventing undesired and/or unintentional removal of the cable or duct from the holding members 106a, 106b, 106c, 106d, 206a, 206b, 206c, 206d after installation.

Figure 5:
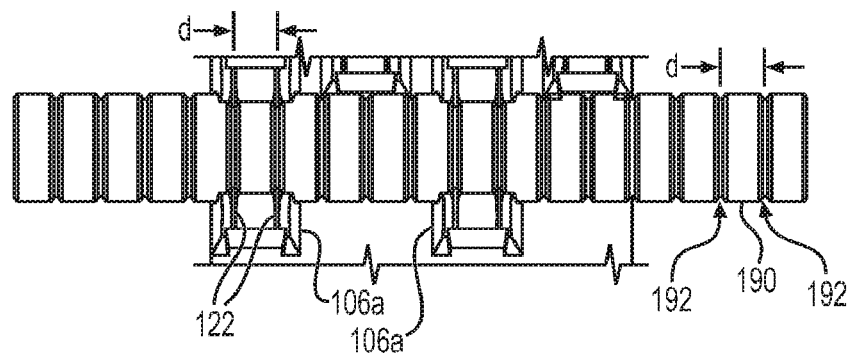
FIG. 5 is a top view of a pair of exemplary holding members of a clip of a stackable bracket holding a duct in accordance with various aspects of the disclosure.

As shown in FIG. 5, in some aspects, the raised ribs 122, 222 may be spaced to match the spacing of complementary grooves 192 of a cable or duct 190, such as for example, a MiniFlex® grooved cable or duct. For example, the centers of the raised ribs 122, 222 may be spaced apart by the same distance d as the distance d between consecutive grooves 192 of the cable or duct. The spacing of the raised ribs 122, 222 of the holding members 106a, 106b, 106c, 106d, 206a, 206b, 206c, 206d allows each of the raised ribs 122, 222 to engage a groove 192 in the cable or the duct. Alternatively, the raised ribs 122, 222 may be spaced apart by a distance nd, where n is a whole number, and d is the distance between the centers of consecutive grooves of the cable or duct. Similarly, the raised ribs 122, 222 of a first one of the holding members of each of the pairs of holding members 106a, 106b, 106c, 106d, 206a, 206b, 206c, 206d are longitudinally spaced from the raised ribs 122, 222 of a second one of the holding members of each of the pairs of holding members 106a, 106b, 106c, 106d, 206a, 206b, 206c, 206d by a distance md, where m is a whole number, and d is the distance between consecutive grooves 192 of the cable or duct 190.

FIG. 5 illustrates a pair of holding members 106a, 106b in combination with a grooved duct 190, such as for example, an 8 mm MiniFlex® microduct. The duct 190 includes grooves 192 having centers that are spaced apart by the distance d. As illustrated, the raised ribs 122, 123 of the holding members 106a, 106b engage with adjacent grooves 192 of the duct 190.

Referring again to FIGS. 1 and 2, the stackable brackets 100, 200 include connecting members 140, 240 that extend from the top surface 114, 214 of the base 102, 202 in a direction that is substantially perpendicular to the substantially planar base 102, 202. Each of the brackets 100, 200 includes two connecting members 140, 240 at opposite ends of the base 102, 202 in the first dimension L. The connecting members 140, 240 are aligned with one another in a direction of the first dimension L. The stackable brackets 100, 200 further include a pair of through holes 142, 242 at opposite ends of the base 102, 202 in the first dimension L and adjacent to the connecting members 140, 240 in a direction of the second dimension W. The through holes 142, 242 are aligned with one another in a direction of the first dimension L. The connecting members 140, 240 may be configured, for example, as locking snap hooks having resilient arms extending perpendicular to the base 102, 202 with fingers at the free end of the arms that can be received by the through holes 142, 242 of another bracket 100, 200 to hold two brackets 100, 200 together.

Figure 6:
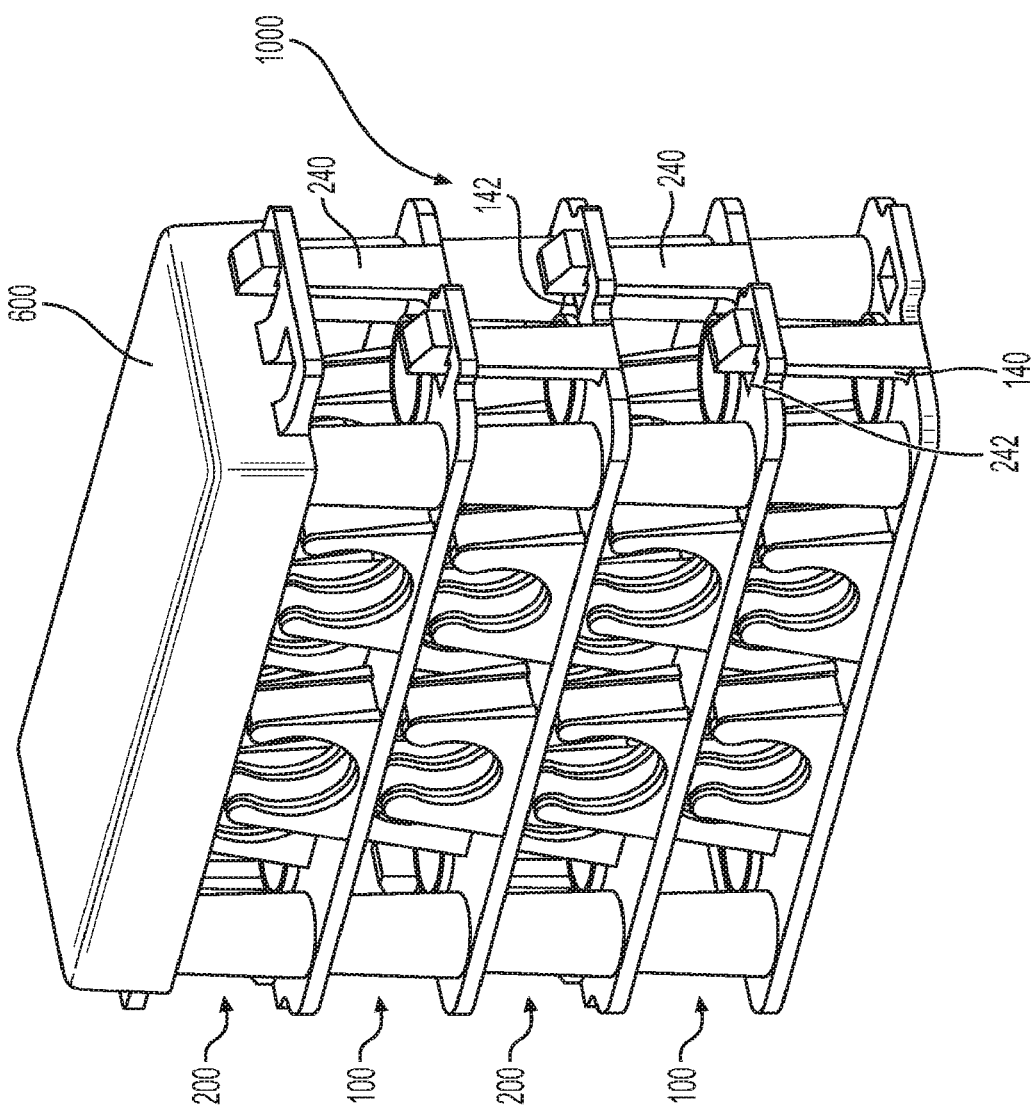
FIG. 6 is a perspective view of an assembly of stackable brackets in accordance with various aspects of the disclosure.

Referring now to FIG. 6, the connecting members 140, 240 and the through holes 142, 242 are arranged relative to one another such that when one of the stackable brackets 100, 200 is rotated 180° relative to the other one of the stackable brackets 100, 200, the connecting members 140 of the bracket 100 are aligned with the through holes 242 of the second bracket 200 in the directions of the first and second dimensions L, W, and the connecting members 240 are aligned with the through holes 142 in the directions of the first and second dimensions. In this 180° configuration, when one of the brackets 100, 200 is placed above the top surface 114, 214 of another one of the brackets 100, 200, the corresponding through holes 142, 242 of the upper bracket 100, 200 are configured to receive the connecting members 140, 240 extending from the lower bracket 100, 200.

Figure 9:
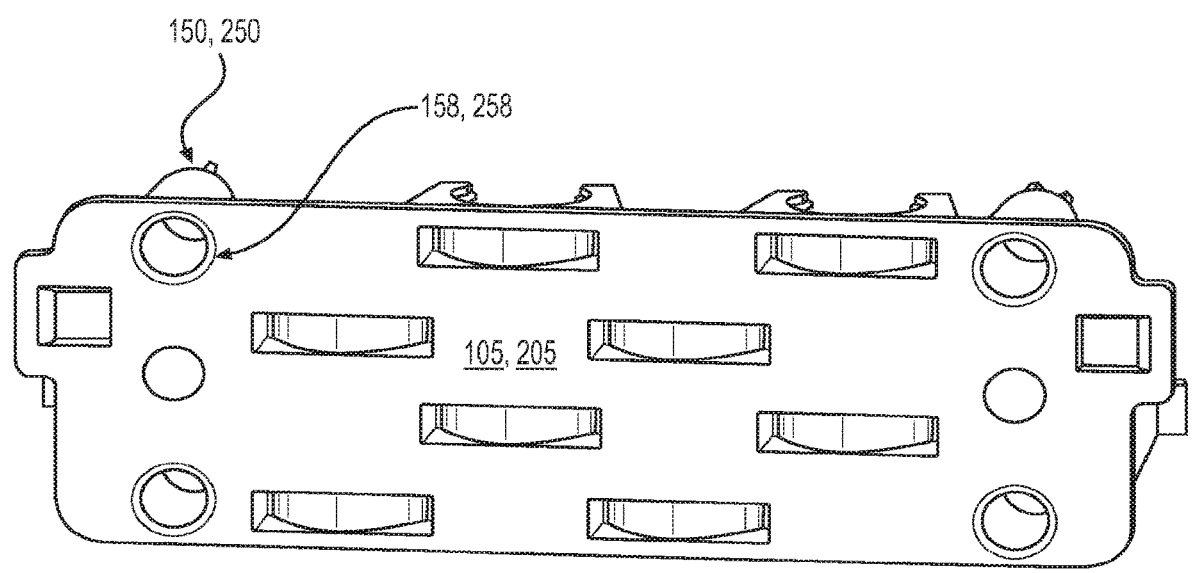
FIG. 9 is a perspective view of a locating member of the stackable bracket of FIG. 1.

The brackets 100, 200 further include one or more locating members 150, 250. For example, the locating members 150, 250 may be configured as pegs that extend from the top surface 114, 214 of the base 102, 202. The locating members 150, 250 may include a base portion 152, 252 defining a platform 154, 254 that is spaced from the top surface 114, 214 of the base 102, 202. As best shown in FIG. 9, a protrusion 156, 256 extends from the platform 154, 254 in a direction away from the top surface 114, 214 and has a cross section in a plane of the first and second dimensions L, W with an area that is smaller than an area of the platform 154, 254.

Figure 7:
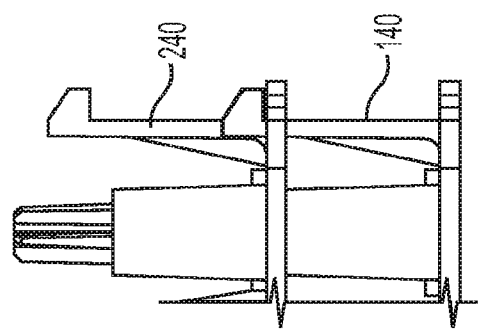
FIG. 7 is a front view of a portion of the assembly of stackable brackets of FIG. 6.
Figure 8:
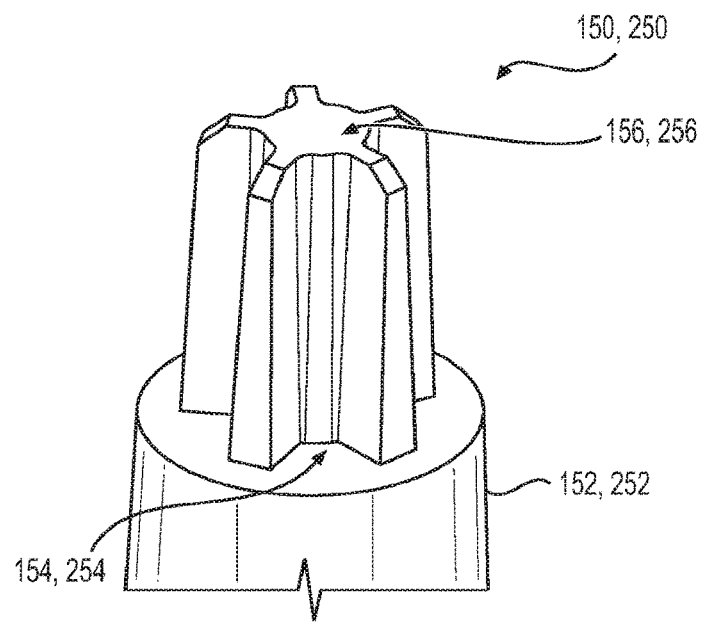
FIG. 8 is a bottom view of the stackable bracket of FIG. 1.

Referring now to FIG. 8, a bottom surface 105 of the bracket 100 includes receptacles 158, 258 defined by hollow interiors of the locating members 150, 250. In some aspects, the protrusion 156, 256 may be configured as a star-shape or torx-shape which provides the protrusion 156, 256 with a degree of resiliency so as to facilitate easy insertion of the protrusion 156, 256 into a corresponding receptacle 158, 258. As shown in FIG. 7, the platform 154, 254 provides a stop surface that limits the extent to which the locating member 150, 250 can be inserted into the receptacle 158, 258 while still permitting the connecting members 140, 240 to extend through the corresponding through holes 142, 242 such that the fingers of the connecting members 140, 240 are at an opposite side of the bracket 100, 200 relative to the platform 154, 254. The connecting members 140, 240 and the protrusions 156, 256 thus cooperate to securely retain two brackets 100, 200 together. The second bracket 200 includes a same bottom surface with the same receptacles as the bracket 100 shown in FIG. 8.

Figure 10:
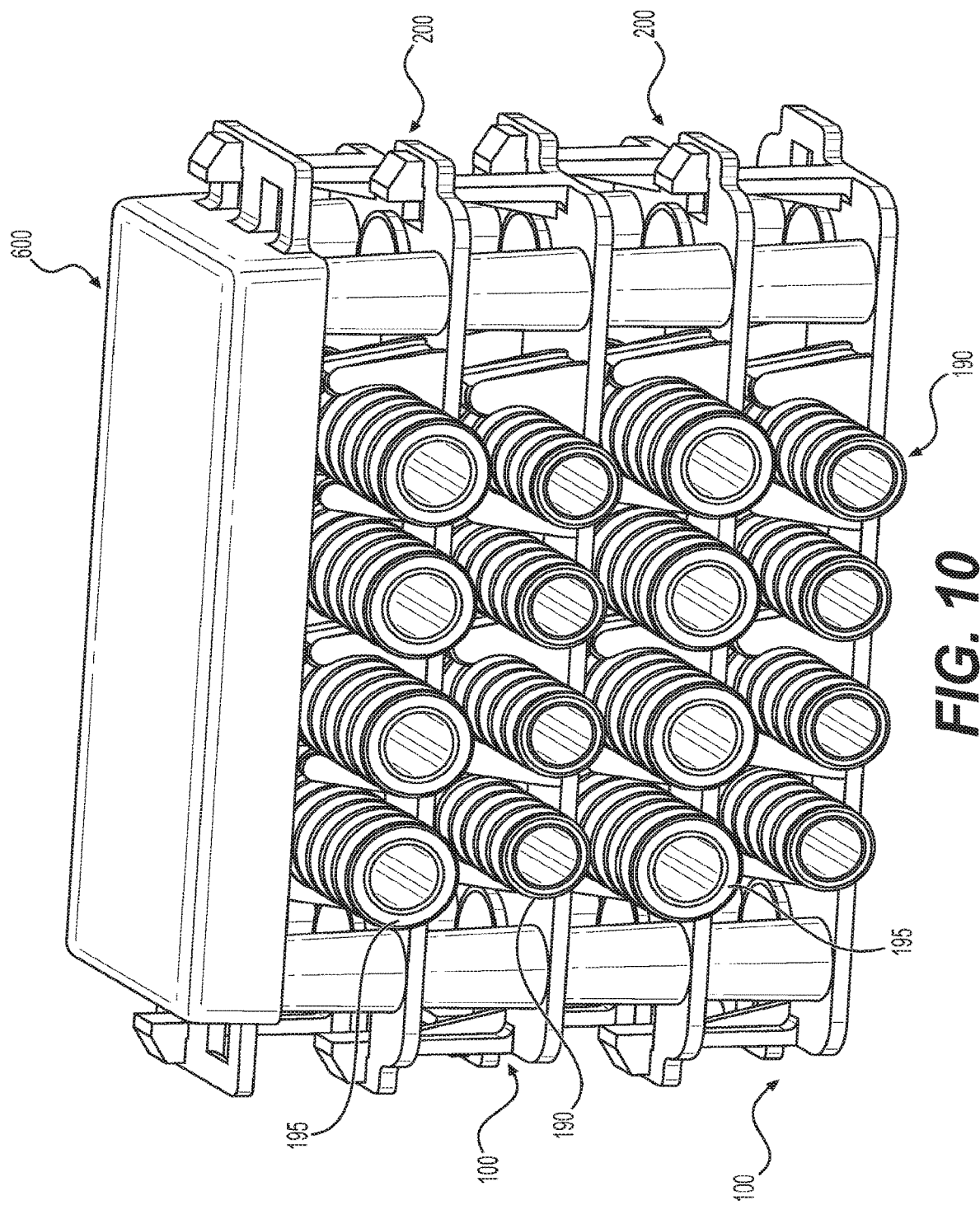
FIG. 10 is a perspective view of an assembly of stackable brackets holding ducts in accordance with various aspects of the disclosure.

The locating members 150, 250 and corresponding receptacles 158, 258 locate one bracket 100, 200 relative to another bracket 100, 200 when the brackets 100, 200 are stacked on top of each other. Thus, the locating members 150, 250 and corresponding receptacles 158, 258 make it easier to form an assembly of stackable brackets 1000, as shown in FIGS. 2, 6, and 10. The locating members 150, 250 and corresponding receptacles 158, 258 may provide the assembly of stackable brackets 1000 with more rigidity.

Referring to FIGS. 2, 6, and 10, the assembly of stackable brackets 1000 may include stackable brackets 100, 200 and a lid 600. As shown in FIG. 10, the assembly of stackable brackets 1000 is configured to receive ducts or cables 190, 195 of different sizes. For example, the duct 190 may be an 8 mm variant, while the duct 195 may be a 10 mm variant. The lid 600 may include two pairs of through holes 642, 644 that are aligned with the connecting members 140, 240 and the through holes 142, 242 when placed above the top surface 114, 214 of one of the brackets 100, 200. The lid 600 may also include a flat exposed surface on which a logo or other identifying information may be applied.

It should be appreciated that the brackets 100, 200 described above can include clips with holding members that are configured to hold any size duct or cable. For example, the holding members described above can be sized and arranged to hold a cable having a 2 mm outside diameter, such as, for example, a 2 mm MiniFlex® flexible optical fiber cable; a cable having a 3 mm outside diameter, such as, for example, a 3 mm MiniFlex® flexible optical fiber cable; a cable having a 8 mm outside diameter, such as, for example, a 8 mm MiniFlex® microduct for receiving optical fiber cable; or a cable having a 10 mm outside diameter, such as, for example, a 10 mm MiniFlex® microduct for receiving optical fiber cable.

It should also be appreciated that in some embodiments each or all of the brackets 100, 200 can be configured to hold one size cable or duct. In other embodiments, one or more of the brackets 100, 200 can be configured to hold cable or ducts of multiple sizes. For example, the bracket 100 can be configured such that holding members 106a, 106c are sized and arranged to hold a 10 mm duct and holding members 106b, 106d are sized and arranged to hold an 8 mm duct.

It is readily apparent that the present invention solves the problems posed by the prior art and overcomes their disadvantages. For example, the aforementioned stackable brackets and assemblies including clips have raised ribs that engage with grooves of a cable or duct held by the clips. The ribs and grooves cooperate to hold the cables or ducts in a fixed position while preventing the cables or ducts from sliding relative to the clips in a longitudinal direction of the cables or ducts. Thus, the brackets and assemblies can be used to hold the cables or ducts at any orientation, including vertical, horizontal, and any angle there between, while maintaining the position of the cables or ducts without slippage. The brackets and assemblies also hold the cables or ducts safely and securely and the base allows for better anchoring to flat surfaces as compared to the prior art.

Having thus described several embodiments of a stackable bracket and an assembly of stackable brackets used to organize, manage, and route ducts, cables, wires and/or cords, it should be apparent to those skilled in the art that certain advantages of the within stackable bracket and assembly have been achieved. It should also be appreciated that various modifications, adaptations, and alternative embodiments thereof may be made within the scope and spirit of the present invention. It should be apparent that many of the inventive steps described above would be equally applicable to other stackable brackets and assemblies.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A stackable bracket, comprising:
a base; and
a plurality of clips configured to extend from the base,
wherein each of the plurality of clips is configured to include a pair of holding members,
wherein each of the holding members of the plurality of clips is configured to define an opening configured to receive one of a plurality of cables or ducts,
wherein the openings of each pair of holding members are configured to be aligned with one another in a first direction,
wherein the plurality of clips are configured to be arranged sequentially relative to one another in a second direction perpendicular to the first direction,
wherein the holding members of the plurality of clips are configured to be staggered relative to one another in the first direction, and
wherein the holding members of a first one of the plurality of clips are configured to overlap the holding members of a second one of the plurality of clips in the second direction.

2. The stackable bracket of claim 1, wherein the holding members of the plurality of clips are configured to hold a duct or a cable having a first outside diameter.

3. The stackable bracket of claim 1, wherein a first one of the pairs of the holding members of the plurality of clips is configured to hold a duct or a cable having a first outside diameter.

4. The stackable bracket of claim 1, wherein the base includes a plurality of locating members extending from the top surface of the base, the locating members being configured to be received by a corresponding plurality of receptacles in a bottom surface of a second bracket.

5. The stackable bracket of claim 1, wherein the holding members are C-shaped.

6. The stackable bracket of claim 1, wherein the base is substantially planar and comprises a rigid material.

7. A stackable bracket assembly comprising the stackable bracket of claim 1 and further including:
a second bracket including
a second base,
a second plurality of clips configured to extend from the second base, and
wherein each of the second plurality of clips is configured to include a pair of holding members,
wherein each of the holding members of the first plurality of clips is configured to define an opening configured to receive one of a first plurality of cables or ducts, and each of the holding members of the second plurality of clips is configured to define an opening configured to receive one of a second plurality of cables or ducts,
wherein the openings of each pair of holding members are configured to be aligned with one another in a first direction,
wherein the first plurality of clips are configured to be arranged sequentially relative to one another in a second direction perpendicular to the first direction, and the second plurality of clips are configured to be arranged sequentially relative to one another in the second direction, and
wherein a plurality of locating members extending from the top surface of one of the first base and the second base are configured to be received by a corresponding plurality of receptacles in a bottom surface of an opposite one of the first bracket and the second bracket.

8. A stackable bracket, comprising:
a base; and
a plurality of clips configured to extend from the base,
wherein each of the plurality of clips is configured to include a pair of holding members,
wherein each of the holding members of the plurality of clips is configured to define an opening configured to receive one of a plurality of cables or ducts,
wherein the openings of each pair of holding members are configured to be aligned with one another in a first direction,
wherein the plurality of clips are configured to be arranged sequentially relative to one another in a second direction perpendicular to the first direction,
wherein the holding members of the plurality of clips are configured to be staggered relative to one another in the first direction, and
wherein each of the holding members includes a pair of first engagement features configured to be aligned with a corresponding pair of second engagement features of one of the plurality of cables or ducts.

9. The stackable bracket of claim 8, wherein the holding members of the plurality of clips are configured to hold a duct or a cable having a first outside diameter.

10. The stackable bracket of claim 8, wherein a first one of the pairs of the holding members of the plurality of clips is configured to hold a duct or a cable having a first outside diameter.

11. The stackable bracket of claim 8, wherein the base includes a plurality of locating members extending from the top surface of the base, the locating members being configured to be received by a corresponding plurality of receptacles in a bottom surface of a second bracket.

12. The stackable bracket of claim 8, wherein the holding members are C-shaped.

13. The stackable bracket of claim 8, wherein the base is substantially planar and comprises a rigid material.

14. A stackable bracket assembly comprising the stackable bracket of claim 8 and further including:
a second bracket including
a second base, a second plurality of clips configured to extend from the second base, and
wherein each of the second plurality of clips is configured to include a pair of holding members,
wherein each of the holding members of the first plurality of clips is configured to define an opening configured to receive one of a first plurality of cables or ducts, and each of the holding members of the second plurality of clips is configured to define an opening configured to receive one of a second plurality of cables or ducts,
wherein the openings of each pair of holding members are configured to be aligned with one another in a first direction,
wherein the first plurality of clips are configured to be arranged sequentially relative to one another in a second direction perpendicular to the first direction, and the second plurality of clips are configured to be arranged sequentially relative to one another in the second direction, and
wherein a plurality of locating members extending from the top surface of one of the first base and the second base are configured to be received by a corresponding plurality of receptacles in a bottom surface of an opposite one of the first bracket and the second bracket.

15. A stackable bracket, comprising:
a base; and
a plurality of clips configured to extend from the base,
wherein each of the plurality of clips is configured to include a pair of holding members,
wherein each of the holding members of the plurality of clips is configured to define an opening configured to receive one of a plurality of cables or ducts,
wherein the openings of each pair of holding members are configured to be aligned with one another in a first direction,
wherein the plurality of clips are configured to be arranged sequentially relative to one another in a second direction perpendicular to the first direction,
wherein the holding members of a first one of the plurality of clips are configured to overlap the holding members of a second one of the plurality of clips in the second direction, and
wherein each of the holding members includes a pair of first engagement features configured to be aligned with a corresponding pair of second engagement features in one of the plurality of cables or ducts.

16. The stackable bracket of claim 15, wherein the holding members of the plurality of clips are configured to hold a duct or a cable having a first outside diameter.

17. The stackable bracket of claim 15, wherein a first one of the pairs of the holding members of the plurality of clips is configured to hold a duct or a cable having a first outside diameter.

18. The stackable bracket of claim 15, wherein the base includes a plurality of locating members extending from the top surface of the base, the locating members being configured to be received by a corresponding plurality of receptacles in a bottom surface of a second bracket.

19. The stackable bracket of claim 15, wherein the holding members are C-shaped.

20. The stackable bracket of claim 15, wherein the base is substantially planar and comprises a rigid material.

21. A stackable bracket assembly comprising the stackable bracket of claim 15 and further including:
a second bracket including
a second base,
a second plurality of clips configured to extend from the second base, and
wherein each of the second plurality of clips is configured to include a pair of holding members,
wherein each of the holding members of the first plurality of clips is configured to define an opening configured to receive one of a first plurality of cables or ducts, and each of the holding members of the second plurality of clips is configured to define an opening configured to receive one of a second plurality of cables or ducts,
wherein the openings of each pair of holding members are configured to be aligned with one another in a first direction,
wherein the first plurality of clips are configured to be arranged sequentially relative to one another in a second direction perpendicular to the first direction, and the second plurality of clips are configured to be arranged sequentially relative to one another in the second direction, and
wherein a plurality of locating members extending from the top surface of one of the first base and the second base are configured to be received by a corresponding plurality of receptacles in a bottom surface of an opposite one of the first bracket and the second bracket.

* * * * *